(12) United States Patent
Clark et al.

(10) Patent No.: US 10,682,795 B2
(45) Date of Patent: Jun. 16, 2020

(54) HIGH MODULUS SPUNBOND

(71) Applicant: FREUDENBERG PERFORMANCE MATERIALS LP, Durham, NC (US)

(72) Inventors: Doug Clark, Raleigh, NC (US); Hoa Pham, Raleigh, NC (US)

(73) Assignee: FREUDENBERG PERFORMANCE MATERIALS LP, Durham, NC (US)

( * ) Notice: Subject to any disclaimer, the term of this patent is extended or adjusted under 35 U.S.C. 154(b) by 456 days.

(21) Appl. No.: 15/492,596

(22) Filed: Apr. 20, 2017

(65) Prior Publication Data
US 2018/0304514 A1    Oct. 25, 2018

(51) Int. Cl.
| | |
|---|---|
| *B29C 48/00* | (2019.01) |
| *B29C 43/24* | (2006.01) |
| *B29C 43/00* | (2006.01) |
| *D01D 4/02* | (2006.01) |
| *D01F 6/62* | (2006.01) |
| *B29C 48/05* | (2019.01) |
| *B29C 48/30* | (2019.01) |
| *B29C 48/345* | (2019.01) |
| *D04H 3/16* | (2006.01) |
| *D04H 3/14* | (2012.01) |
| *D01D 5/098* | (2006.01) |
| *D01F 6/84* | (2006.01) |
| *D01D 5/08* | (2006.01) |
| *B29C 43/52* | (2006.01) |
| *B29K 67/00* | (2006.01) |
| *B29L 31/00* | (2006.01) |

(52) U.S. Cl.
CPC ........ *B29C 48/0011* (2019.02); *B29C 43/003* (2013.01); *B29C 43/24* (2013.01); *B29C 48/022* (2019.02); *B29C 48/05* (2019.02); *B29C 48/30* (2019.02); *B29C 48/345* (2019.02); *D01D 4/02* (2013.01); *D01D 5/082* (2013.01); *D01D 5/0985* (2013.01); *D01F 6/62* (2013.01); *D01F 6/84* (2013.01); *D04H 3/14* (2013.01); *D04H 3/16* (2013.01); *B29C 43/52* (2013.01); *B29K 2067/003* (2013.01); *B29L 2031/726* (2013.01)

(58) Field of Classification Search
CPC .. B29C 48/0011; B29C 48/345; B29C 48/022
See application file for complete search history.

(56) References Cited

U.S. PATENT DOCUMENTS

| | | | |
|---|---|---|---|
| 7,914,723 B2 | 3/2011 | Kim et al. | |
| 8,093,161 B2 | 1/2012 | Bansai et al. | |
| 2003/0171052 A1* | 9/2003 | Bansal | D01F 8/06 442/327 |
| 2009/0068420 A1* | 3/2009 | Pascavage | B32B 5/08 428/196 |

OTHER PUBLICATIONS

"A Review Of Spun Bond Process", H. Lim, Journal of Textile Apparel, Technology and Management, vol. 6, Issue 3, Spring 2010.
Bhat et al., "Thermal Bonding of Polypropylene Nonwovens: Effect of Bonding Variable on the Structure and Properties of the Fabrics", Journal of Applied Polymer Science, vol. 92, 3593-3600 (2004), Tennesee, U.S.
ASTM D 5034-95, Standard Test Method for Breaking Strength and Elongation of Textile Fabrics (Grab Test) (2001), Annual Book of ASTM Standards, vol. 07.02.

\* cited by examiner

*Primary Examiner* — Jacob T Minskey
*Assistant Examiner* — Ymelody Tsui
(74) *Attorney, Agent, or Firm* — Grossman, Tucker, Perreault & Pfleger, PLLC

(57) ABSTRACT

The present invention is directed at a relatively high modulus spunbond nonwoven material that is suitable for use in relatively high deep draw molding applications.

12 Claims, No Drawings

HIGH MODULUS SPUNBOND

FIELD

The present invention is directed at a relatively high modulus spunbond nonwoven material that is suitable for use in relatively high deep draw molding applications.

BACKGROUND

Nonwoven fabrics are generally understood as fabric-like materials, made from fibers that are bonded together by chemical, mechanical, heat or even solvent treatment. They may be in the form of sheet or web structures. They are not made by weaving or knitting and do not require conversion of the fibers to yarn. Nonwoven fabrics therefore seek to provide the appearance, texture and strength of a woven fabric and can result in a variety of useful products for apparel, home furnishings, and a variety of consumer goods.

The spunbond process generally makes use of a polymer feed, a metering pump, a die assembly, a filament spinning, a drawing and deposition system, a collecting belt, a bonding zone and a winding. See, e.g., "*A Review Of Spun Bond Process*", H. Lim, Journal of Textile Apparel, Technology and Management, Vol. 6, Issue 3, Spring 2010.

One particular type of spunbond non-woven is sourced from polyester type polymers. Polyester spunbond can amount to a manufactured sheet of randomly oriented polyester filaments bonded by calendaring, needling, chemically with a binder, or a combination of these methods. In general, relatively small diameter filaments can be formed by extruding one or more molten polyester fibers from a spinneret. The extruded fibers are cooled while being drawn to form spunbond fibers or continuous filaments, which are deposited or laid onto a forming surface in a random manner to form a loosely entangled web. This web is then subjected to a bonding process.

SUMMARY

A method for producing a non-woven web comprises supplying thermoplastic polymer matrix resin and thermoplastic polymer binder resin. This is followed by separately heating and extruding the matrix resin and binder resin and feeding a spinneret, wherein the spinneret has a number of holes for the matrix resin (# $SH_{MATRIX}$) and a number of spinneret holes for the binder (# $SH_{BINDER}$), wherein # $SH_{MATRIX}$/# $SH_{BINDER}$=4.0 to 6.0. Fibers are then formed from the spinneret where the matrix fibers are formed at a value of 8.0 dtex to 13.0 dtex and the binder fibers are formed at a value of 3.0 dtex to 6.0 dtex, wherein the matrix fibers are present at a level of 90.0% by weight to 95.0% by weight and the binder fiber is present at a level of 5.0% by weight to 10.0% by weight.

The present invention also applies to a method for producing a non-woven web comprising supplying thermoplastic polymer matrix resin and thermoplastic polymer binder resin. This is followed by separately heating and extruding the matrix resin and binder resin and feeding a first spinneret and a second spinneret, wherein the first spinneret has a number of holes for the matrix resin (# $SH_{MATRIX}$) and the second spinneret has a number of spinneret holes for the binder (# $SH_{BINDER}$), wherein # $SH_{MATRIX}$/# $SH_{BINDER}$=4.0 to 6.0. Fibers are then formed from the first and second spinneret where the matrix fibers are formed at a value of 8.0 dtex to 13.0 dtex and the binder fibers are formed at a value of 3.0 dtex to 6.0 dtex, wherein the matrix fibers are present at a level of 90.0% by weight to 95.0% by weight and the binder fiber is present at a level of 5.0% by weight to 10.0% by weight. The matrix and binder fibers are then passed through calendar rolls and then heated to melt the binder fibers and form said non-woven web.

DETAILED DESCRIPTION

The present invention is directed at a relatively high modulus spunbond nonwoven material. The spunbond material is preferably formed from matrix fibers and binder fibers, where the binder fibers are thermally activated and then serve as a binder for the matrix fibers. The matrix fibers are preferably formed from a polyester selected from an aromatic polyester, such as polyethylene terephthalate (PET). The PET fibers preferably have a melting point (Tm) that is above the melting point of the binder fibers. Preferably, the PET has a melting point of at least 240° C., or in the range of 240° C. to 265° C. More preferably, the PET has a Tm in the range of 250° C. to 260° C. The PET is also one that preferably has an intrinsic viscosity in the range of 0.60 dL/g to 0.71 dL/g, more preferably in the range of 0.64 dL/g to 0.68 dL/g. The PET may include carbon black, at a level of 0.1% by weight to 2.0% by weight.

The binder fibers are preferably selected from an aromatic copolyester. An aromatic copolyester is reference to a polymer having a PET type repeating unit and another repeating ester type unit that reduces the Tm of the copolyester from that which would otherwise be present on the basis of PET on its own. One particularly preferred binder fiber resin is Auriga 8591, which is understood to be a copolymer based upon terephthalic acid and adipic acid with ethylene glycol to form the copolyester repeating unit with a Tm of about 190° C. to 200° C. It may therefore be appreciated that other binder fiber resins that rely upon the use of a comonomer with terephthalic acid, such as some other aliphatic dicarboxylic acid other than adipic acid, to reduce observed values of Tm, may be utilized.

The binder fibers therefore preferably have a Tm that is lower than the matrix PET fibers. Preferably, the binder fibers have a Tm that is lower than 240° C., and more preferably, in the range of 185° C. to a temperature less than 240° C. Even more preferably, the binder fibers have a Tm in the range of 185° C. to 230° C.

The binder fiber is preferably present in the spunbond here at a level of less than or equal to 10.0% by weight, or more preferably, in the range of 5.0% by weight to 10.0% by weight. The matrix fibers are therefore preferably present at a corresponding value of 95.0% by weight to 90.0% by weight. Most preferably, the level of binder is present at a level of 7.0% by weight to 8.0% by weight, e.g., at a level of 7.5% by weight. In such a case, the level of matrix fibers are in the range of 92.0% by weight to 93.0% by weight, more preferably 92.5% by weight. The preferred composition of binder resin, namely the copolyester resin, is also further characterized as preferably having an intrinsic viscosity in the range of 0.705-0.755 and a maximum moisture content of <60 ppm.

With regards to the preparation of the spunbond herein, the above referenced and preferred PET and copolyester binder are preferably combined and separately extruded and then preferably passed through one spinneret die to form the corresponding fibers. A spinneret is reference to a device used to extrude the polymer melt to form fibers. However, more than one spinneret die is contemplated, such as one for the matrix fibers and one for the binder fibers.

In the case of a single spinneret die, the PET and copolyester are directed to selected portions of the spinneret so that they may each be spun into fibers with a targeted fiber thickness. The size (diameter) of the spinneret holes for the matrix fibers (e.g. PET) are preferably in the range of 0.50 mm and can vary +/−0.05 mm. The size of the spinneret holes for the binder fibers (e.g. copolyester) are preferably in the range of 0.45 mm and can vary +/−0.05 mm.

Expanding upon the above, it should be noted that the spinneret herein is one that supplies a preferred number of spinneret holes for the matrix fibers (# $SH_{MATRIX}$) and a preferred number of spinneret holes for the binder fibers (# $SH_{BINDER}$). For example, the number of holes for forming the matrix fibers is preferably in the range of 120 to 130 and the number of holes for forming the binder fiber is preferably 24 to 26. As can therefore initially be appreciated, the number of holes for formation of the matrix fibers exceeds the number of holes for formation of the binder fibers (# $SH_{MATRIX}$ ># $SH_{BINDER}$).

More specifically, it has been determined that preferably, for producing the spunbond fabric herein having relatively high modulus and elongation capability (discussed further herein) the following ratio preferably applies: # $SH_{MATRIX}$/# $SH_{BINDER}$=4.0 to 6.0, more preferably 4.5 to 6.0, and even more preferably, 4.5 to 5.5. By way of example, if the number of spinneret holes for the matrix fiber (# $SH_{MATRIX}$) is 120 and the number of holes for the spinneret binder fibers (# $SH_{BINDER}$) is 24, the ratio is 120/24=5.0.

Once passing through the spinneret the fibers can be drawn to a desired target size. Preferably, the PET fibers are formed at value of 8.0 dtex to 13.0 dtex, more preferably in the range of 9.0 dtex to 11.0 dtex, and in a highly preferred configuration, a dtex value of 10.0+/−0.5 dtex. The unit of dtex herein is a reference to the mass in grams of fiber/10,000 meters. The PET fibers preferably have a diameter in the range of 25 microns to 37 microns, more preferably in the range of 30 microns to 35 microns, and in a highly preferred configuration, a diameter of 32.0 microns+/−0.5 microns.

The binder fibers are also drawn and preferably formed at a value of 3.0 dtex to 6.0 dtex, more preferably 3.5 dtex to 5.5 dtex, and in a highly preferred configuration, a dtex value of about 4.5+/−0.5 dtex. The binder fibers also preferably have a diameter in the range of 19.0 microns to 25.0 microns, more preferably in the range of 19.4 microns to 24.2 microns, and in a highly preferred configuration, a diameter of 22.0 microns+/−0.5 microns.

The fibers produced from the above are then preferably thermally bonded. This is preferably achieved by initially collecting the fibers from the spinneret and passing them through metal calendar rolls to achieve a desired thickness in the range of 0.1 mm to 1.0 mm, more preferably 0.3 mm to 0.7 mm. Thermal bonding will now be facilitated at the various cross-over points as between the matrix and binder fibers which are now compressed together and in relatively closer proximity.

It is worth nothing that the calendar rolls are also such that they are preferably not embossed or engraved with some desired point bonding pattern to promote bonding at selected locations in the web. However, in the course of bonding herein it is contemplated that there can also be thermal point bonding wherein one may utilize an embossed or engraved roll and one roller that does not have such features, so that bonding is promoted at more selected locations in the final non-woven product.

Both of the calendar rolls are therefore preferably heated to a temperature in the range of 110° C. to 170° C., more preferably in the range of 125° C. to 150° C., and in a particularly preferred embodiment, a temperature in the range of 140° C. to 150° C. or 145° C. to 150° C. The calendar pressure applied to the fibers is preferably in the range 15 daN/cm to 50 daN/cm, more preferably 25 daN/cm to 45 daN/cm, and even more preferably 30 daN/cm to 40 daN/cm. At these temperatures and pressure there may be some limited melting of the binder fibers that are present.

Once passing through the calendar roll, the fibers are then preferably heated with forced hot air, although other heating techniques are contemplated. The air temperature is such that it will cause melting of the binder fibers without melting of the matrix fibers. In the case of using PET as the preferred matrix fiber with a Tm of 240° C. to 265° C. and the use of a copolyester binder fiber with a Tm of 185° C. to a temperature less than 240° C., the hot air temperature is set to a temperature of 190° C. to 220° C., more preferably, 200° C. to 210° C.

In connection with the above heating, the melting of the binder fibers is one that is conducted such that preferably, substantially all of the binder fiber that is present undergoes melting. In such regard, that is understood to occur under circumstances where one can observe, with respect to the binder fibers that are present, that for a given area, 90% or more of such fibers are no longer of fiber form and have undergone melting such that their fiber geometry is no longer observed. As may be appreciated, this melting causes bonding of the matrix fibers and the relatively high tensile strength, under elevated temperature conditions, are described below.

That is, the spunbond that is then formed is collected on a roller and is one that when tested indicates useful mechanical properties at elevated temperatures. Such properties are evaluated by testing according to ASTM D5034 [Standard Test Method For Breaking and Elongation of Textile Fabrics (Grab Test), Approved Sep. 10, 2001, Published May 2002] using a heated chamber around the spunbond undergoing evaluation. That is, the temperature of the chamber is set to 320° F. and the spunbond is evaluated in both the machine direction and transverse direction, at this temperature condition, utilizing an Instron Tensile Tester, a 300 mm/min crosshead speed, jaw dimensions are 1.0"×1.0" & 1.5"×2.0" in each clamp, gage length to 3.0 inches, at a specimen size of 100 mm×150 mm. The fabric should be allowed to come to temperature of testing and let stand for 10 minutes to condition sample before beginning the tensile test. From this testing, the spunbond herein indicates a hot tensile strength at 50% elongation (320° F.) in the machine direction in the range of 200 to 275 Newtons, more preferably 200 to 250 Newtons, and even more preferably, in the range of 220 to 240 Newtons for 120 gsm spunbond fabric. The spunbond also indicates a hot tensile strength at 50% elongation (320° F.) in the transverse direction in the range of 150 to 250 Newtons, more preferably 175 to 225 Newtons, and in a particular preferred configuration, 190 to 210 Newtons for 120 gsm spunbond fabric. It should be recognized that other weights will have proportional values by weight ratio to these preferred hot tensile strength numbers. For example, for 100 gsm fabric herein, the 250 Newton value for hot tensile strength at 50% elongation (320° F. in the machined direction would be: (100 gsm/120 gsm)×250 Newtons=208 Newtons.

The spunbond nonwoven herein is one that has been found as particularly suitable for use in the manufacture of automotive flooring products. More specifically, the spunbond herein is one that can be used in relatively high draw molds, which is reference to molds that elongate the spunbond to a level in the range of 40% to 65%, more preferably in the range of 50% to 60%. The temperature during such elongation is preferably in the range of 290° F. to 360° F. As noted above, the hot tensile strength values for the spunbond make it particular suitable for this type of application.

What is claimed is:

1. A method for producing a non-woven web comprising:
    supplying thermoplastic polymer matrix resin and thermoplastic polymer binder resin;
    separately heating and extruding said matrix resin and binder resin and feeding a spinneret, wherein said spinneret has a number of holes for said matrix resin (# $SH_{MATRIX}$) and a number of spinneret holes for said binder (# $SH_{BINDER}$), wherein # $SH_{MATRIX}$/# $SH_{BINDER}$=4.0 to 6.0;
    forming fibers from said spinneret where said matrix fibers are formed at a value of 8.0 dtex to 13.0 dtex and said binder fibers are formed at a value of 3.0 dtex to 6.0 dtex, wherein the matrix fibers are present at a level of 90.0% by weight to 95.0% by weight and the binder fiber is present at a level of 5.0% by weight to 10.0% by weight;
    passing said matrix fibers and binder fibers through calendar rolls and then heating to melt said binder fibers and form said non-woven web.

2. The method of claim 1 wherein # $SH_{MATRIX}$/# $SH_{BINDER}$=4.5 to 6.0.

3. The method of claim 1 wherein # $SH_{MATRIX}$/# $SH_{BINDER}$=4.5 to 5.5.

4. The method of claim 1 wherein said spinneret holes for said matrix fibers have a diameter of 0.50 mm (+/−0.05 mm) and said spinneret holes for said binder fibers have a diameter of 0.45 mm (+/−0.05 mm).

5. The method of claim 1 wherein said matrix fibers and binder fibers pass through said calendar rolls and emerge at a thickness of 0.1 mm to 1.0 mm.

6. The method of claim 1 wherein said calendar rolls are heated to a temperature in the range of 110° C. to 170° C.

7. The method of claim 1 wherein said calendar rolls are not embossed or engraved with a point bonding pattern.

8. The method of claim 1 wherein said thermoplastic polymer matrix resin comprises PET with a Tm in the range of 240° C. to 260° C.

9. The method of claim 1 wherein said thermoplastic binder resin has a Tm that is lower than 240° C.

10. The method of claim 6 wherein said thermoplastic binder resin comprises a copolymer based upon terephthalic acid, adipic acid and ethylene glycol and having a Tm of 190° C. to 200° C.

11. The method of claim 1 wherein said calendar rolls apply a pressure in the range of 15 daN/cm to 50 daN/cm.

12. The method of claim 1 wherein said non-woven web indicates, for a 120 gsm spunbond prepared by said method, a hot tensile strength at 50% elongation (320° F.) in the machine direction in the range of 200 Newtons to 275 Newtons and in the transverse direction in the range of 150 Newtons to 250 Newton.

* * * * *